Jan. 12, 1965  O. STERNBECK  3,165,568
PROCEDURE OF MANUFACTURING IMPREGNATED ELECTRICAL CONDENSERS
Filed Aug. 29, 1960

INVENTOR
OLAF STERNBECK

BY Hane and Nydick
ATTORNEYS

United States Patent Office 3,165,568
Patented Jan. 12, 1965

3,165,568
PROCEDURE OF MANUFACTURING IMPREGNATED ELECTRICAL CONDENSERS
Olaf Sternbeck, Alvsjo, Sweden, assignor to Telefonaktiebolaget L M Ericsson, Stockholm, Sweden, a corporation of Sweden
Filed Aug. 29, 1960, Ser. No. 52,646
Claims priority, application Sweden, Sept. 4, 1959
3 Claims. (Cl. 264—272)

Electrical condensers, especially condensers with dielectric of organic material, generally have to be protected against the influence of moisture and other atmospheric impurities. One way of obtaining such a protection is to provide a sufficiently tight coating covering the whole condenser roll, by covering the roll with a hardening liquid, by suitable heat treatment, "curing," hardening resin (epoxy, polyester, polyurethane, or similar). The encapsulation of the roll is carried out in a mold of such material or such surface finish, that the coated condenser roll after the curing may be taken out of the mold. In order to obtain a really satisfactory moisture protection, it is necessary that the organic dielectric of the condenser roll, that is sensitive to moisture, after the hardening, is not exposed at any point of the periphery thereof. Contrary to the case of electrical apparatus exposed to comparatively low dielectric strains, for instance transformers and similar circuit components, it is not sufficient with condensers to fill the space in the mold with an adequate material without preventing the propagation of moisture in the generally hygroscopic dielectric by means of a tight outer coating of some kind. The difficulty of obtaining in a simple and effective way a coating in the form of a satisfactory envelope for the condenser is due to the fact that especially with small components with small thickness of the coating, it is difficult to place the component in the mold so as to obtain an adequate centering of the component.

The object of the invention is to eliminate said difficulty, and to provide an encapsulated condenser with the required moisture proof quality.

Thus the invention provides a method of manufacturing an impregnated electrical condenser with high resistivity to electric voltage, according to which the condenser roll is dried and impregnated with a material which, after the impregnation will harden to a solid. The method is characterized by first placing in a mold of somewhat bigger volume but with approximately the same extension as the condenser roll a foil of non-hygroscopic material and then the condenser in such a way that the foil is located between the bottom of the mold and the condenser, whereafter the mold is filled with the impregnator.

Figure 1:
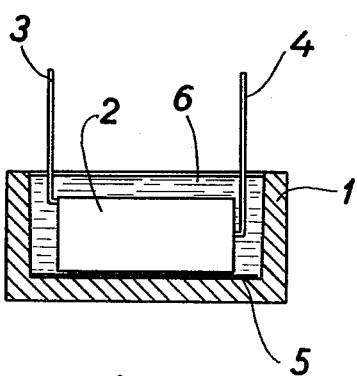
Figure 2:
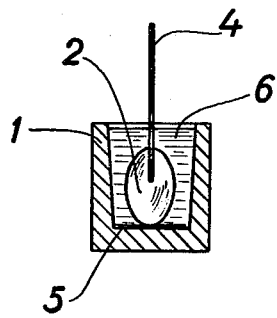
Figure 3:
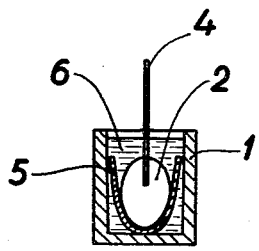
Figure 4:
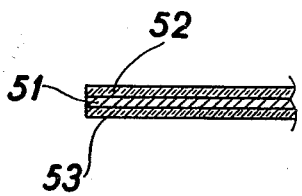

The invention will be further described with reference to the attached drawing: FIG. 1 and FIG. 2 show partly in section two views of a device for carrying out the method according to the invention; FIG. 3 shows the device of FIG. 2 somewhat modified, and FIG. 4 shows a part of a foil, that may be used for carrying out the method according to the invention.

The device according to FIGS. 1 and 2 includes a mold 1, in which is first placed a foil 5 of non-hygroscopic material, for instance mica, metal, glass, or dense ceramic, and then a condenser roll 2, the terminals of which are indicated by 3 and 4. The foil 5 is located between the bottom of the mold 1 and the coil 2. Thus after having placed the roll in the mold and dried the roll (which may be carried out before placing in the mold), the impregnator 6 is added, if desired, under vacuum. Considering especially the shrinking of the impregnator when hardening, care has to be taken that the roll 2 is entirely covered by a suitable thickness of the impregnator. After having by the curing transformed the impregnator to a solid, the finished condensers 2, 3, 4, and 6 are taken out of the mold. It is also possible to retain the mold as a permanent outer coating.

As material for the mold 1 a plastic may be used, for instance polyethylene, Teflon or rubber, especially silicon rubber or a metal prepared with a non-adhesive, for example silicon grease.

As material for the foil 5 it has been found especially adequate to use thin foils (thickness of less than 0.5 mm.) of soft aluminum or copper. On the foil the data of the condenser may be given.

The idea of invention, to protect the condenser roll from direct contact with the mold during the impregnation, can naturally be utilized in many ways. Especially if the condenser roll is substantially flat on two opposite sides, it may be convenient, as shown in FIG. 3, to let the foil 5 extend into the space between the roll 2 and the sides parallel to the axis of the roll, whereby direct contact is prevented between any of said sides and the roll.

If the ends of the roll 2 are not insulated, it is convenient to provide the foil 5 as a metal foil 51, which on both sides is covered with an electrically insulating coating 52 and 53, see FIG. 4. Hereby a short-circuit of the ends by the diaphragm is safely avoided. As material for this electrically insulating coating paper or plastic may be used, for instance polyester (Mylar), polycarbonate, a coating of alkyd of polyuretan enamel, or oxide coating, formed on aluminum directly by anodic oxidation. Where the impregnating material has better electrical and thermal qualities than the electrically insulating coating, the latter should have an irregular surface.

In order to avoid cracking of the coating of the condenser roll it is important that the shrinking of the impregnator is less than 5% and that the foil has a small thickness compared to the dimensions of the condenser.

I claim:
1. A method of encapsulating an electric roll type condenser, which method comprises loosely inserting a free form foil made of moisture-impervious material together with the condenser to be encapsulated in a mold so that the foil is placed between the base of the mold and the condenser, and then filling the mold with a thermosetting resin so that the foil and the condenser thereupon are fully submerged in the resin.
2. A method of encapsulating a condenser as set forth in claim 6, wherein the foil is also placed between condenser and sides of the mold parallel to the axis of the roll.
3. A method of encapsulating a condenser as set forth in claim 6, wherein the foil includes a moisture-proof metallic material and an adjacent layer on each side thereof of insulating material.

References Cited in the file of this patent
UNITED STATES PATENTS
2,646,535   Coggeshall et al. _____ July 21, 1953
2,857,626   Wagner et al. _____ Oct. 28, 1958

FOREIGN PATENTS
305,554   Sweden _____ May 2, 1955
515,891   Great Britain _____ Dec. 18, 1939

OTHER REFERENCES
German printed application N 6,225, Mar. 1, 1956.